United States Patent [19]

Lucas

[11] Patent Number: 5,135,666
[45] Date of Patent: Aug. 4, 1992

[54] MARINE OIL SPILL CLEAN-UP METHOD USING A MOTION COMPENSATOR MEANS

[76] Inventor: James E. Lucas, 13303 Evergreen, Tomball, Tex. 77375

[21] Appl. No.: 704,823

[22] Filed: May 23, 1991

[51] Int. Cl.$^5$ .............................................. E02B 15/04
[52] U.S. Cl. .................................... 210/776; 210/236; 210/237; 210/242.3; 210/250; 210/260; 210/923; 405/203
[58] Field of Search ...................... 210/776, 923, 242.3, 210/236, 237, 249, 250, 260, 259, 261; 114/265, 270; 405/203

[56] References Cited

U.S. PATENT DOCUMENTS

| | | | |
|---|---|---|---|
| 2,337,754 | 12/1943 | Lannert | 210/237 |
| 3,578,171 | 4/1969 | Usher | 210/242.3 |
| 3,593,529 | 7/1971 | Smulders | 114/265 |
| 3,633,749 | 1/1972 | Panosh | 210/923 |
| 3,800,951 | 4/1974 | Mourlon et al. | 210/242.3 |
| 3,946,684 | 3/1976 | Sumner | 405/203 |
| 4,265,758 | 5/1981 | Fox | 210/242.3 |
| 4,295,975 | 10/1981 | Walin | 210/242.1 |
| 4,581,181 | 4/1986 | Nicholls | 210/242.1 |
| 4,882,073 | 11/1989 | Griffith | 210/776 |
| 5,015,399 | 5/1991 | Eller | 210/776 |

*Primary Examiner*—Robert A. Dawson
*Assistant Examiner*—Sun Uk Kim
*Attorney, Agent, or Firm*—Joseph F. Long

[57] ABSTRACT

An improvement in efficiency of marine type oil spill clean up is achieved by using slideable fastners and support legs extending from a floatable unit to hold a skimmer unit in a relatively fixed horizontal position while using retractable cables with a hydraulic tensioning means to maintain the skimmer in a nearly constant relationship to the wave surfaces.

7 Claims, 2 Drawing Sheets

MARINE OIL SPILL CLEAN-UP METHOD USING A MOTION COMPENSATOR MEANS

BACKGROUND OF THE INVENTION

Recently, there has been an increased awareness of possible harm done to the environment when marine oil spills occur. A variety of devices and equipment have been produced for spill clean up, mostly by skimming or other mechanical separation means. Almost all of these devices must be attached to a boat or mounted on other type floating platforms in order to perform spill clean-up tasks.

The single most significant problem in marine oil spill clean-up operations is the physical control and management of floating equipment. The effects of wind, waves, current, or other environmentally induced forces severely limit the utilization of clean-up devices. These operational constraints result from the inability of the operator to maintain a fixed relative position between the skimming apparatus and the surface of the contaminated water.

All equipments currently employed to perform skimming operations are dependent upon the ability to selectively differentiate between water and the material being removed from the surface of that water. The effectiveness of an oil skimming device can be reduced to only a percentage of its capacity when subjected to the forces of the marine environment.

The objective of this invention is to provide a method for overcoming the effects of wind, waves, and current on the operation of surface skimmers and separators. This is accomplished by use of a special purpose vessel that may be rendered stationary and motion compensating equipment attached to the vessel.

We have developed a device that is effective in the deployment, positioning, and operation of equipment used to skim or otherwise remove oil and other contaminants from the surface of water. The use of this device is applicable in all bodies of water and is particularly useful in oceans, bays, estuaries, rivers and lakes. The purpose of this invention is to provide a mounting platform for oil skimming and separation equipment that is capable of being used as a floating, self powered transport device and upon arrival at the spill site, convert to a fixed structure, insensitive to most environmentally induced forces. The invention is equipped with oil skimming and separation devices mounted on motion compensated frames to further improve the operation effectiveness in skimming and separation.

There are several basic types of skimmers commercially available. The following list identifies some types that are applicable for use with this invention:
Boom-skimmer
Disc
Lifting belt
Paddle belt
Rope mop
Sorbent belt
Suction head
Submersed belt
Submersed plane
Vortex
Weir Selection of an appropriate type of skimmer is based on specific conditions of the spill site including; oil viscosity, depth of oil, wave height, wind velocity, rate of current and water temperature. Change in any one o combination of these factors may alter the preferred selection of skimmer type and require a halt or modification in the logistics of the clean-up operation.

Wave height is a most critical factor on skimmer performance because the wave induced motions in the floating skimmer causes the oil collection mechanism to intermittently lose contact with oil floating on the surface. Simple skimmers such as weirs perform poorly in rough seas because the weir lip is alternately above or below the oil/water interface causing the skimmer to alternately draw in air or water. Boom skimmers with good heave stiffness help to keep the weir at the water surface but short choppy waves alter its performance and cause the device to ingest large quantities of water.

Skimmers with a large inertial mass generally have problems following the oil water interface along the wave cycle. In an attempt to solve this problem, some skimmers have been designed so that the mass of the skimmer in the water is quiet low. In addition, pumps, tanks and other heavy components have been removed from the skimmer and located on the support vessel. Some skimmers have collection elements that offer low mass per unit length characteristics that result in good wave pattern conformance. Rope mops and boom skimmers are good examples of these kinds of devices.

Some skimmers with relatively high inertial masses are able to follow long period wave patterns well. Floating disc skimmers and some specialized weir skimmers operate well in long period conditions.

Lifting belt skimmers and submersion belt skimmers are able to operate in a range of wave patterns in which the waves are not higher than the vertical dimension of their belts. Similarly, submersion plane skimmers can operate in waves that are not higher than the vertical dimension of their submersion planes. Currents affect the performance of skimmers because high currents generally cause the skimmer to be displaced from the optimum position for oil removal and result in the escape of oil under or around the collection device. Also high currents may result in vertical movement of anchored skimming devices and, subsequently, intake swamping and low oil/water recovery ratios.

The performance of all of the listed skimmers may be greatly enhanced by restriction or reduction of motions relative to the surface being skimmed. Our invention removes pitch and roll which are the inherent motions in all floating devices. In addition, our invention utilizes motion compensation techniques that cause the skimming device to more closely follow surface motions. This action results in lower relative displacement between the skimming device and the skimmed surface and higher recovery rates and percentage of efficiency.

BRIEF SUMMARY OF THE INVENTION

The invention comprises an oil spill clean-up method using a marine transportation vehicle, also called a multipurpose transportation unit, that may be 36' beam × 75' overall length, or greater or less size, and equipped with retractable and extensible support legs that may be 100' long, or greater or less size, allowing the vehicle to move under power on the waters surface to a location, to stop and extend its legs to the bottom and to raise the vehicle above the water to become a stationary platform. Once elevated to an optimum working level, the multipurpose unit is useful as a fixed base for attachment and operation of one or more of any of a multitude of different skimmers, an operations management center, crew quarters and a recovered oil storage tank battery. Oil storage may be in drums, tanks or the transportation vehicle or other types of marine transportation such as barges anchored nearby. At present, skimmers ar normally operated from a boat or other floating platform and may be rigidly or non rigidly attached to the boat or floating platform; in either case the boat and skimmer or floating platform and skimmer are subjected to wave actions that translate to roll, pitch, heave and yaw.

In the present invention, the multipurpose unit is placed in a stationary position and a skimmer mounted on a guide frame, moves up or down on vertical guide posts which extend downward from the platform. The guide frame, guide post system provides a method for maintaining a fixed heading for the skimmer and eliminates the motions of roll, pitch and yaw. The invention reduces the effects of heave by the use of a motion compensation system that uses one or more buoyancy modules on the skimmer guide frame to partially support its weight and one or more tensioned cables that are attached to the skimmer guide frame. Thus, a skimmer will remain in a fixed heading but be allowed to travel in a vertical movement to follow the rise and fall of a wave. The guide frame and skimmer will follow the rise of the wave due to the buoyancy module but would be prevented from making a free fall downward by the tensioned cable or cables. The buoyancy modules may be styrofoam blocks, hollow tanks with adjustable ballast or similar type units. The rate of fall is adjustable by varying the amount of tension applied to the guide frame tensioning cables. A preferred type of skimmer for us with the invention is a series of discs that collect oil on their surface as they rotate through the oil water interface near the surface. The discs are mounted vertically so that approximately one half of the diameter is immersed in the oily water mixture. The disc is rotated, and as the rotation occurs through the oily water, oil clings to the disc surfaces. At the proper point, a blade held against the disc scrapes the oil from the surfaces of the disc into an oil collector for pumping to storage. Efficient use of the skimmer requires that the disc remain in a constant relative position to the oily water surface.

The accepted practice for using skimming devices is to position them down wind and down current from the oil spill site. The use of a floating containment boom that may be deployed by the platform service crane and a small boat and the forces of wind and current, channel the oil toward the skimmer for removal.

With a unit that restricts a skimmer to a controlled vertical motion such as we have described, a baffled settling type skimmer with the moving parts being only a recovered oil pump and very low head water pump, would also be within the limits of this invention.

DETAILED DESCRIPTION OF THE DRAWINGS

The method and equipment used for the oil spill clean-up may be best described from the drawings.

Figure 1:
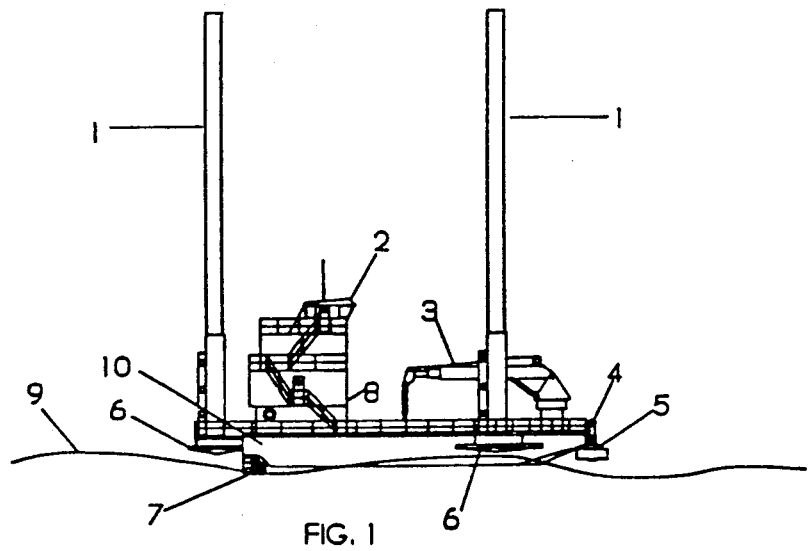
FIG. 1 shows the multipurpose transportation unit in a movable mode on the water surface.
Figure 4:
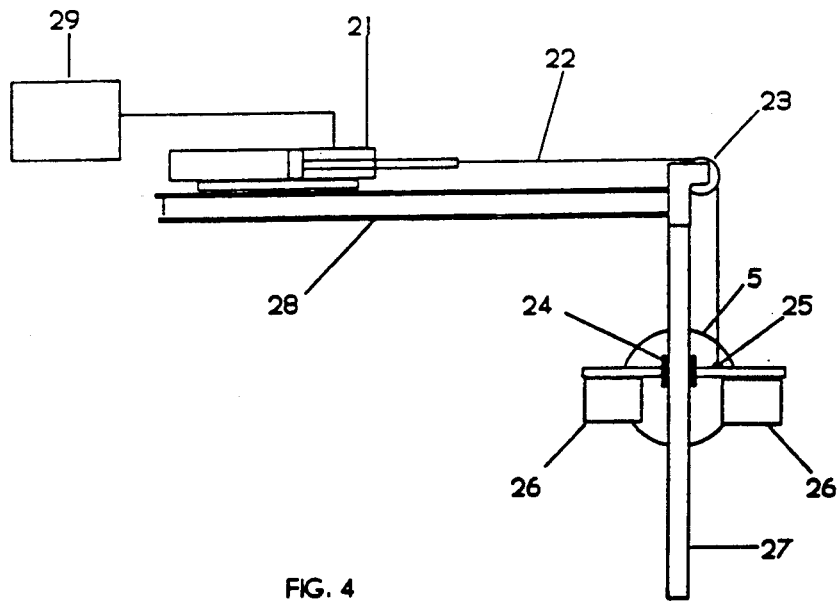
FIG. 4 shows details of the motion compensation system.

In FIG. 1 we show the multipurpose transportation unit 10, in a movable position in water 9. Elevating legs 1 allow raising the body of the unit 10 above water 9 as long as the extensible length of legs 1 is greater than water depth. Most oil spills are cleaned from water less than 100 feet deep and legs of one hundred twenty feet or more are sufficient, although larger units may have longer legs. Displacement pads 6 spread the weight of the unit over an area to aid in prevention of settling and tilting of the body 10. Propulsion unit 7 may be electrical, steam or fossil fuel driven. The multipurpose unit may be sparsely or more luxuriously furnished. Normal minimum equipment would comprise:

a) power means to raise and lower legs 1 which are a minimum of three in number;
b) wheelhouse 2 to provide weatherproof headquarters for personnel;
c) control and powerhouse 8;
d) a deck crane 3 that may be used for boom deployment and handling equipment;
e) a skimmer 5 and a motion compensator 4 that are shown in more detail in FIG. 4;
f) oil storage or equipment to connect to oil storage along with the necessary pumps and power means such as fossil fuel drive driven generators.

Figure 2:
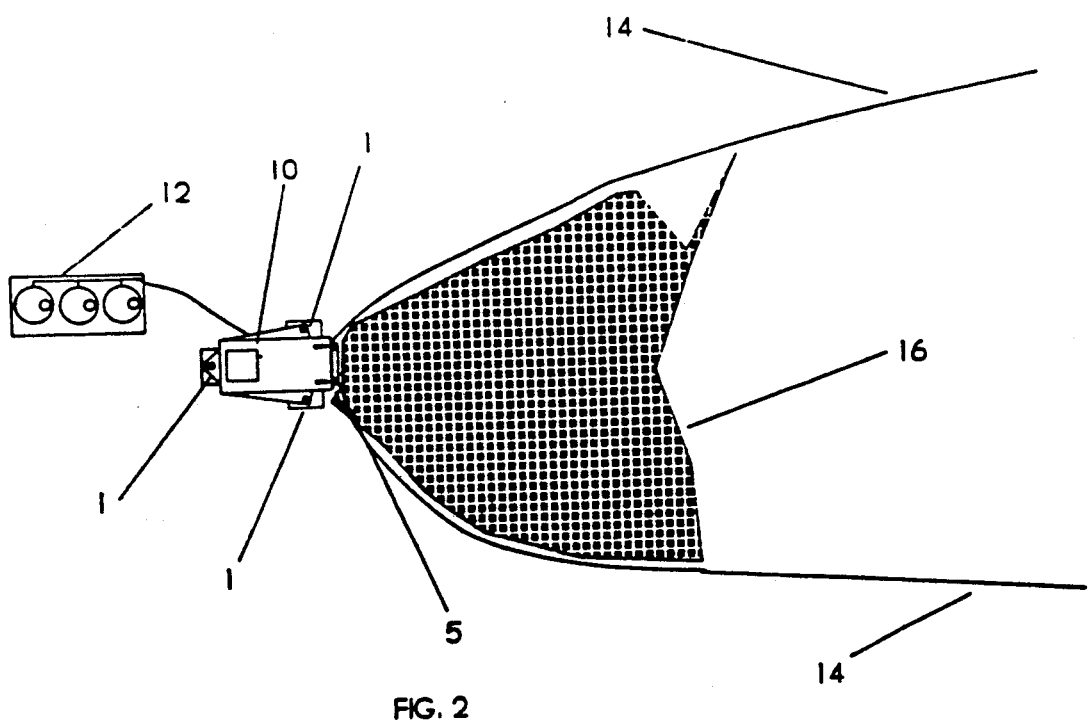
FIG. 2 show a plan view of the multipurpose transportation system in fixed position utilizing containment boom and water currents to direct oil to the skimmer or skimmers mounted on the multipurpose transportation unit.
Figure 3:
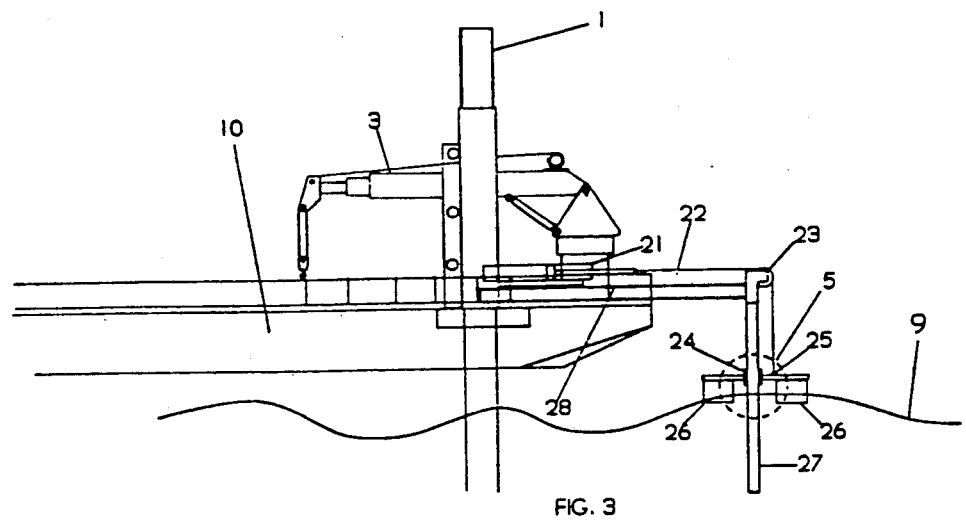
FIG. 3 shows the bow of the multipurpose transportation unit elevated to a fixed position and the skimmer mounted on the guide frame in an operational mode.

In FIG. 2 we show a plan view of unit 10 in the elevated, skimming position with containment booms 1 deployed to direct oil 16 to the skimmer 5 which is positioned on the guide frame 24, FIG. 3, with a recovered oil discharge line to an oil storage barge 12 to store oil as it is recovered by the skimmer 5. A preferred type skimmer is a disc type but any of several types should give greatly improved performances over a wide variety of environmental conditions when attached in a vertically movable manner to a stationary body 10.

In FIG. 3 we show a side view of the bow end of unit 10 raised into the in use position by extending legs 1. Deck crane 3 may be located at the bow for handling the skimmer 5 containment boom 14, FIG. 2, and unit equipment. Skimmer 5 is shown mounted to guide frame 24 to move up and down on guide posts 27. Buoyant blocks 26 and tensioned cables 22 serve to properly position the skimmer relative to water surface with cylinder 21 holding proper tension on cable 22 which attaches to guide frame 24 at point 25 and goes over guide rollers 23.

FIG. 4 shows a side view of motion compensation equipment. One of two guide posts 27 attached to mounting frame 28 which is fastened to multipurpose unit 10 is shown. A guide frame 24 with guide sleeves which are attached on each end of skimmer 5 with guide frame 24 connected at point 25 with tensioned guide cables 22 running over guide rollers 23 and attached to motion compensation cylinders 21. Buoyancy modules 26 are sized to require a hydraulic or air pressure from controller 29 to activate the piston in cylinder 21 to cause a constant tension on cables 22 to cause skimmer 5 to be positioned in a constant relative position to the water surface. Now as a wave or swell passes under the buoyant module 26 the attached skimmer 5 will be lifted by the wave displacement until the wave crest is reached with the controller 29 providing pressure to maintain tension on cable 22 and as the wave or swell crest passes the skimmer 5 and buoyancy module 26 will begin to lower smoothly due to the constant tension being applied to the cables 22 by cylinders 21. This prevents erratic vertical movement and results in constant relative position between skimmer and water surface 9.

What is claimed is:

1. A marine type oil spill clean-up method comprising:
 a) moving a multipurpose clean-up unit adjacent to said oil spill; said multipurpose clean-up unit comprising:
  1) a power driven floatable body;
  2) a minimum of three retractable and extensible support legs;
  3) a skimmer and a motion compensator means mounted on said floating body; said motion compensator means using retractable cables held under tension to cause said skimmer to move up an down on vertical guide posts to follow wave surfaces;
  4) oil containment booms and a means to deploy said containment booms to direct said oil spill towards said skimmer on said floatable body;
 b) extending said extensible legs to raise said floatable body above said oil spill and to hold said body to a stationary position;
 c) lowering said skimmer into an in-use position;
 d) deploying said oil containment booms to direct said oil spill towards said skimmer;
 e) pumping oil separated by said skimmer to oil storage.

2. A marine type oil spill clean-up method as in claim 1 wherein said motion compensator means for said skimmer comprises:
 a) said vertical guide posts attached to said multipurpose clean-up unit to allow a guide frame attached to said simmer to move up and down with said retractable cables attached to said guide frame;
 b) a hydraulic driven piston means an da controller to control the pressure driving said hydraulic driven piston means to maintain constant tension on said rotatable cables as a means to raise and lower said simmer with buoyancy of said skimmer and said constant tension on said retractable cables acting to maintain relative position of said skimmer to water surface with swells of up to 12 feet.

3. A marine type oil spill clean-up method as in claim 1 wherein said motion compensator means comprises:
 a) a guide frame for mounting for said skimmer slideably attached to said vertical guide posts projecting downward from said floatable body with said retractable cables attached to said guide frame;
 b) buoyancy adjustment means to adjust depth of said skimmer on said guide frame in said oil spill;
 c) a cable tensioning means for said retractable cables to hold said tension on aid retractable cables to cause said guide frame to move smoothly up and down to follow wave surfaces.

4. A marine type oil spill clean-up method comprising:
 a) moving a clean-up unit adjacent to said oil spill; said clean up unit comprising:
  1) a floatable body;
  2) a minimum of three retractable and extensible support legs attached to said floatable body;
  3) a skimmer operable from said floating body when said floating body is in a stationary position; said skimmer being slideably mounted on vertical guide rods attached to said floatable body and held by retractable cables under tension to cause said skimmer to move smoothly up and down to follow wave surfaces;
  4) containment booms to direct said oil spill toward said skimmer;
  5) pumping means to pump recovered oil to a storage means for recovered oil;
 b) extending said extensible legs to raise said floatable body above said oil spill;
 c) placing said skimmer into an in-use position;
 d) deploying said oil containment booms to direct said oil spill towards said skimmer;
 e) pumping oil separated from water by said skimmer to a marine transportation unit.

5. A marine type oil spill clean-up method as in claim 4 wherein said skimmer is a rotating disc type skimmer.

6. A marine type oil spill clean-up method as in claim 4 wherein said skimmer is a type of skimmer chosen from a group consisting of boom skimmer, disc, lifting belt, paddle belt, submersed belt, submersed plane, vortex, weir, rope mop, sorbent belt, suction head and setting types.

7. A motion compensator unit for an oil skimmer comprising:
 a) a buoyant mounting unit;
 b) a guide frame for mounting said oil skimmer slideably attached to vertical guides projecting downward from said buoyant mounting unit;
 c) a buoyancy adjustment means to adjust depth of said skimmer mounted on said guide frame when said skimmer is in an in-use position to remove oil from a water surface;
 d) retractable cables mounted on said buoyant mounting unit and connected to said guide frame;
 e) cable tensioning means for said retractable cables to hold tension on said retractable cables to cause said guide frame to move smoothly up and down to follow wave motion of said water surface.

* * * * *